United States Patent [19]

Hauser et al.

[11] 4,407,882

[45] Oct. 4, 1983

[54] PRINTING INK COMPOSITIONS AND USE THEREOF FOR THE PRODUCTION OF TEXTURED FOAMED RESIN MATERIALS

[75] Inventors: Hanspeter Hauser, Aesch; Peter Eckert, Magden, both of Switzerland

[73] Assignee: Ciba-Geigy Corporation, Ardsley, N.Y.

[21] Appl. No.: 282,573

[22] Filed: Jul. 13, 1981

[30] Foreign Application Priority Data

Jul. 15, 1980 [CH] Switzerland .................. 5413/80

[51] Int. Cl.³ .................. B29D 27/00; C09D 11/02
[52] U.S. Cl. .................. 428/159; 106/20; 106/22; 264/52; 521/72
[58] Field of Search .................. 106/20, 22; 264/52, 264/DIG. 82, DIG. 5; 428/159; 521/72

[56] References Cited

U.S. PATENT DOCUMENTS

| | | | |
|---|---|---|---|
| 3,293,094 | 12/1966 | Nairn et al. | 156/79 |
| 3,293,108 | 12/1966 | Nairn et al. | 161/160 |
| 3,844,814 | 10/1974 | Bettoli et al. | 117/111 |
| 4,083,907 | 4/1978 | Hamilton | 264/52 |
| 4,177,155 | 12/1979 | Popplewell et al. | 252/49.3 |
| 4,191,581 | 3/1980 | Hamilton | 106/20 |

*Primary Examiner*—Lorenzo B. Hayes
*Assistant Examiner*—Amelia B. Yarbrough
*Attorney, Agent, or Firm*—Luther A. R. Hall

[57] ABSTRACT

The invention provides a printing ink composition comprising a pigment or pigment preparation, a thermoplastic resin, water, a water-soluble solvent, and, as inhibitor for preventing the foaming of a foamable material containing a blowing agent, an azole of the formula

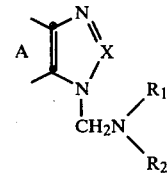

wherein A is a benzene or naphthalene radical, X is a nitrogen atom or the

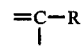

group, wherein R is a hydrogen atom or an alkyl group of 1 to 4 carbon atoms, $R_1$ is an alkyl or alkenyl group, each of 1 to 20 carbon atoms, a hydroxyalkyl group of 2 to 20 carbon atoms, an alkoxyalkyl or cyanoalkyl group, each of 3 to 20 carbon atoms, a cycloalkyl group of 5 to 12 carbon atoms, or a phenalkyl group of 7 to 9 carbon atoms, $R_2$ has the same meaning as $R_1$ and can in addition be hydrogen, or $R_1$ and $R_2$, together with the nitrogen atom to which they are attached, form a heterocyclic ring.

The inhibitors employed in the printing ink compositions of this invention have the advantage that they do not require a pH regulator, i.e. they can also be used for printing inks having a pH lower than 8, and have the further advantage that they can be more easily incorporated in printing ink compositions, have a better compatibility with aqueous acrylic resins, a better stability in PVC latices, have less influence on the viscosity and have a lower toxicity than aminotriazoles.

10 Claims, No Drawings

PRINTING INK COMPOSITIONS AND USE THEREOF FOR THE PRODUCTION OF TEXTURED FOAMED RESIN MATERIALS

For producing foam plastics products having an embossed surface it is known to print selected areas of the surface of a foamable polymer material with printing ink compositions containing an agent that inhibits foaming when the printed material is subsequently subjected to a heat treatment. The material is expanded at the non-printed areas or at the areas to which a printing ink composition without foam inhibitor has been applied, leaving depressions at those areas printed with inks containing a foam inhibitor.

Up to now, aliphatic or aromatic dicarboxylic acids and their anhydrides or halides have been used as foam inhibitors (q.v. Swiss Pat. No. 458 712). However, these inhibitors are not suitable for aqueous printing inks. In the meantime, aqueous printing inks have acquired ever increasing importance for environmental and industrial hygiene reasons. As inhibitors for such printing inks there have been used e.g. triazoles, in particular benztriazole and aminotriazoles. These printing inks, however, have the drawback that they need an alkali to dissolve these particular inhibitors and to adjust the pH of the printing ink to a value above 8.

Accordingly, it is the object of the present invention to provide a printing ink composition for the production of textured foamed surfaces, said composition comprising a pigment or pigment preparation, a thermoplastic resin, water, a water-soluble solvent, and, as inhibitor for preventing the foaming of a foamable material containing a blowing agent, an azole of the formula

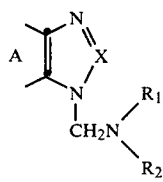
(1)

wherein A is a benzene or naphthalene radical, X is a nitrogen atom or the

group, wherein R is a hydrogen atom or an alkyl group of 1 to 4 carbon atoms, $R_1$ is an alkyl or alkenyl group, each of 1 to 20 carbon atoms, a hydroxyalkyl group of 2 to 20 carbon atoms, an alkoxyalkyl or cyanoalkyl group, each of 3 to 20 carbon atoms, a cycloalkyl group of 5 to 12 carbon atoms, or a phenalkyl group of 7 to 9 carbon atoms, $R_2$ has the same meaning as $R_1$ and can in addition be hydrogen, or $R_1$ and $R_2$, together with the nitrogen atom to which they are attached, form a heterocyclic ring.

A further object of the invention is to provide a method of embossing a heat-foamable resinous material by applying the printing ink compositions of the invention to selected areas of the surface of a heat-foamable resinous material containing a blowing agent, and subsequently heating said material to above the decomposition temperature of the blowing agent.

Suitable pigments for the printing ink compositions of this invention are both inorganic pigments, for example carbon black, titanium dioxide, zinc sulfide, cadmium sulfide or iron oxides, and organic pigments, in particular those of the phthalocyanine, anthraquinone, perionone, indigoid, thioindigoid, dioxazine, isoindoline, isoindolinone, perylene, azo, quinophthalone and quinacridone series, and metal complexes, for example of azo, azomethine or methine pigments. It is also possible to use mixtures of different pigments.

It is particularly advantageous to use pigment preparations, in particular those which contain, as carrier, a polyacrylic resin which contains carboxyl groups. The production of such preparations is described e.g. in German Offenlegungsschrift No. 2 729 892. It is expedient to use 1 to 10 parts by weight of pigment, based on 100 parts by weight of the printing ink composition.

As foam inhibitor it is preferred to use an azole of the formula

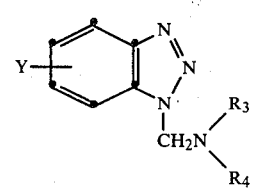
(2)

wherein $R_3$ and $R_4$ are alkyl radicals of 1 to 6 carbon atoms or hydroxyalkyl radicals of 2 to 6 carbon atoms, and Y is a hydrogen atom, an alkyl group of 1 to 6 carbon atoms, preferably the methyl group, or a phenalkyl group of 7 to 9 carbon atoms.

The following table lists some examples of suitable azoles of the formula (3):

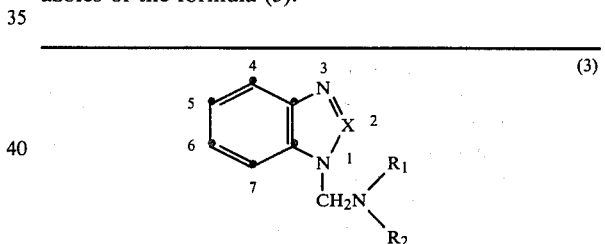
(3)

| Compound | X | $R_1$ | $R_2$ |
|---|---|---|---|
| 1 | N | β-hydroxyethyl | β-hydroxyethyl |
| 2 | CH | β-hydroxyethyl | β-hydroxyethyl |
| 3 | N | β-hydroxypropyl | β-hydroxypropyl |
| 4 | N | γ-hydroxypropyl | γ-hydroxypropyl |
| 5 | CH | γ-hydroxypropyl | γ-hydroxypropyl |
| 6 | N | —CH$_2$—CH=CH$_2$ | —CH$_2$—CH=CH$_2$ |
| 7 | CH | —CH$_2$—CH=CH$_2$ | —CH$_2$—CH=CH$_2$ |
| 8 | N | methyl | β-hydroxyethyl |
| 9 | N | methyl | γ-hydroxypropyl |
| 10 | CH | methyl | γ-hydroxypropyl |
| 11 | N | n-octadecyl | H |
| 12 | CH | n-octadecyl | H |
| 13 | N | β-methoxyethyl | β-methoxyethyl |
| 14 | CH | γ-methoxypropyl | γ-methoxypropyl |
| 15 | N | ethyl | ethyl |
| 16 | C(CH$_3$) | β-hydroxyalkyl | β-hydroxyalkyl |
| 17 | C(C$_4$H$_9$) | β-hydroxyalkyl | β-hydroxyalkyl |

Further suitable azoles are: 1-morpholinomethyl-benztriazole and 1-piperazinomethyl-benztriazole.

A mixture consisting of 1-bis-(β-hydroxyethylamino)methyl-5- and -6-methyl-benztriazole and -benzimidazole is of particular interest.

The above azoles are known compounds, the production of which is described in British Pat. No. 1,466,558.

It is advantageous to use 2 to 20 parts by weight of azole, based on 100 parts by weight of the printing ink composition. The azole can be incorporated in the printing ink composition direct, but preferably in the form of a concentrated aqueous solution.

Examples of thermoplastic printing ink resins are, in particular, polyvinyl chloride, polyvinylidene chloride, copolymers of vinyl chloride and vinyl acetate, polyurethane, polyvinyl acetate, polyvinyl alcohol, or a polyacrylic resin, preferably one containing free carboxyl groups, as well as mixtures of these resins.

It is advantageous to use 15 to 40 parts by weight of resin, based on 100 parts by weight of the printing ink composition.

As organic solvents it is preferred to use water-soluble and, in particular, water-miscible, solvents. Preferred solvents are aliphatic alcohols containing 1 to 4 carbon atoms, for example methanol, ethanol, n-propanol, isopropanol or n-butanol. However, it is also possible to use other organic solvents such as ketones, e.g. acetone or methyl ethyl ketone, and esters, e.g. ethyl acetate, and glycol ethers, e.g. glycol monomethyl and monoethyl ether. Mixtures of different solvents can also be used.

It is convenient to use 5 to 25, preferably 10 to 25, parts by weight of organic solvent based on 100 parts of printing ink composition. If desired, smaller amounts of organic solvent can also be used.

The foamable polymer materials are printed by conventional methods, for example by screen printing, relief printing or planographic printing, but preferably by rotogravure printing.

It is possible to print a very wide range of foamable polymer materials, which are preferably on a support, for example on thin felt, a bonded fibre fabric, knits or wovens made of cotton, wool, asbestos, glass or synthetic fibres, a thermoplastic or elastomeric plastic sheet, e.g. made from a butadiene/styrene copolymer, polychloroprene, polyvinyl chloride or polyvinyl acetate. If the support is made from a fibre material, it is conveniently impregnated, before being coated, with a resin, e.g. polyvinyl chloride, polyvinylacetate, a copolymer of viny chloride and viny acetate, a polyacrylate or polymethacrylate, polyethylene, polystyrene, a butadiene/styrene copolymer, a butadiene/acrylonitrile copolymer, as well as natural or synthetic rubber or a rubber-like polymer.

The foamable resinous materials consist preferably of a dispersion of one or more resins in a liquid medium. The best results are obtained by using a plastisol, i.e. a dispersion of a polymer in a plasticiser, as this has good flow properties at room temperature, but is converted by heat (gelation) into a malleable and tough thermoplastic composition. Preferred resins are polymers of vinyl chloride, e.g. polyvinyl chloride, as well as copolymers of 60–95% of vinyl chloride and 40–5% of another vinyl chloride and 40–5% of another vinyl compound. Suitable plasticisers are the esters customarily employed for the purpose, such as dioctyl phthalate, tricresyl phosphate or octyl diphenyl phosphate, and also polymer plasticisers.

The foamable materials contain a blowing agent. Blowing agents are compounds which decompose on being heated with liberation of an inert gas, and the residues of which are compatible with the materials used in the mixtures. Preferred blowing agents are azodicarboxamide ($H_2NCON=N-CONH_2$), bis-(p-hydroxybenzenesulfonyl)hydrazide, bis-(p-hydroxybenzenesulfonyl)semicarbazide, azo-bis-isobutyronitrile, diazoaminobenzene and N,N'-dimethyl-N,N'-dinitrosoterephthaldiamide.

The foamable materials can also contain conventional fillers and pigments as well as stabilisers.

After it has been printed, the foamable material is heated until softened, in the course of which the blowing agent decomposes and a cellular structure is formed. This heat treatment is preferably carried out in a hot-air oven. The foamed product is allowed to cool slowly.

Compared with inhibitors used in the printing inks of German Offenlegungsschrift No. 2 729 892, the inhibitors employed in the printing ink compositions of this invention have the advantage that they do not require a pH regulator, i.e. they can also be used for printing inks having a pH lower than 8, and have the further advantage that they can be more easily incorporated in printing ink compositions, have a better compatibility with aqueous acrylic resins, a better stability in PVC latices, have less influence on the viscosity and have a lower toxicity than aminotriazoles.

The invention is illustrated by the following Examples, in which parts and percentages are by weight, unless otherwise stated.

EXAMPLE 1

Preparation of the Printing Ink

With stirring, 5 parts of a pigment preparation obtained according to German Offenlegungsschrift No. 2 729 892 and consisting of 60% of C.I. Pigment Red 122 and 40% of a water-soluble acrylic resin, are stirred with 40 parts of an aqueous alcoholic solution which contains 30–40% of a water-soluble acrylic resin in the form of an amine salt (e.g. Aquahyde 100, available from Lawter Chemicals, acid number 76), 10 parts of 1-bis-($\beta$-hydroxyethyl)aminomethylbenztriazole, 10 parts of isopropanol and 40–50 parts of water.

EXAMPLE 2

The procedure of Example 1 is repeated, using C.I. Pigment Yellow 83.

EXAMPLE 3

The procedure of Example 1 is repeated, using $\beta$-copper phthalocyanine.

EXAMPLE 4

With stirring, 5 parts of a pigment preparation obtained according to German Offenlegungsschrift No. 2 729 892 and consisting of 60% of C.I. Pigment Red 122 and 40% of a water-soluble acrylic resin, are stirred with 15 parts of an aqueous alcoholic solution which contains 30–40% of a water-soluble acrylic resin in the form of an amine salt, 50 parts of an approx. 55% aqueous PVC latex (e.g. Lonzavyl Latex P 712 ®, available from Lonza), 10 parts of a mixture of 1-bis-($\beta$-hyroxyethyl)aminomethyl-5- and -6-methyl-benztriazole, 15 parts of isopropanol and 5 parts of water.

EXAMPLE 5

With stirring, 5 parts of a pigment preparation obtained according to German Offenlegungsschrift and consisting of 65% of Pigment Yellow 83 and 35% of a water-soluble acrylic resin, are stirred with 85 parts of an aqueous alcoholic solution which contains 10 parts of polyvinyl alcohol (e.g. Mowiol 4-88 ®, available from Hoechst), 28 parts of isopropanol and 62 parts of water, and 10 parts of 1-bis-(β-hydroxyethyl)aminomethyl-benztriazole.

EXAMPLE 6

The procedure of Example 1 is repeated, using the benzimidazole of the formula (3) (X=CH) instead of 1-bis-(β-hydroxyethylamino)methylbenztriazole.

EXAMPLE 7

Preparation of the Foamable Plastisol

A foamable plastisol is prepared by grinding the following constituents on a 3 roll mill:

50 parts of PVC (dispersion type, specific viscosity 0.6),
50 parts of PVC (dispersion type, specific viscosity 0.4),
25 parts of butylbenzyl phthalate,
45 parts of di-(2-ethylhexyl)phthalate,
7 parts of titanium dioxide,
3 parts of azodicarboxamide,
1.5 parts of stabiliser.

The above plastisol is applied as a uniform layer with a thickness of 300 μm to the surface of a felted cellulose sheet having a thickness of 635μ and which is impregnated with 20% of polyvinyl acetate and coated with PVC latex. The plastisol layer is then gelled by being heated to 154° C. for 50 seconds.

Then one or more printing ink compositions of Examples 1-6 are applied, in a cylinder rotogravure printing machine, to the surface of the gelled layer. When producing multicoloured patterns, printing ink compositions of Examples 1-6 are often applied in addition to ink compositions which do not contain the foam inhibitor. A plastisol covering layer is further applied to the printing surface.

The entire coating is then passed through an oven and slowly heated therein to 204° C., whereupon the blowing agent decomposes and the plastisol layer forms a foamed layer with depressions at the areas printed with the printing ink compositions of Examples 1-6.

What is claimed is:

1. A printing ink composition comprising a pigment or pigment preparation, a thermoplastic resin, water, a water-soluble organic solvent and an inhibitor for preventing the foaming of a foamable material containing a blowing agent, said inhibitor being an azole of the formula

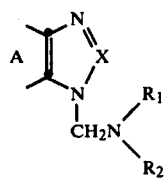

(1)

wherein A is a benzene or naphthalene radical, X is a nitrogen atom or the

group, wherein R is a hydrogen atom or an alkyl group of 1 to 4 carbon atoms, $R_1$ is an alkyl or alkenyl group, each of 1 to 20 carbon atoms, a hydroxyalkyl group of 2 to 20 carbon atoms, an alkoxyalkyl or cyanoalkyl group, each of 3 to 20 carbon atoms, a cycloalkyl group of 5 to 12 carbon atoms, or a phenalkyl group of 7 to 9 carbon atoms, $R_2$ has the same meaning as $R_1$ and can in addition be hydrogen, or $R_1$ and $R_2$, together with the nitrogen atom to which they are attached, form a heterocyclic ring.

2. A printing ink composition according to claim 1, which contains an azole of the formula

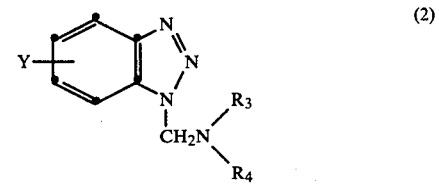

(2)

wherein $R_3$ and $R_4$ are alkyl radicals of 1 to 6 carbon atoms or hydroxyalkyl radicals of 2 to 6 carbon atoms, Y is a hydrogen atom, an alkyl group of 1 to 6 carbon atoms or a phenalkyl group of 7 to 9 carbon atoms.

3. A printing ink composition according to either of claims 1 or 2, which contains an azole of the formula (2), wherein Y is a methyl group which is in the 5- or 6-position.

4. A printing ink composition according to claim 1, wherein the thermoplastic resin is a water-soluble, emulsifiable or dispersible acrylic resin, polyvinyl chloride or copolymer of vinylchloride and vinyl acetate, polyvinyl acetate, polyvinyl alcohol or a polyurethane.

5. a printing ink composition according to claim 1, wherein the principal solvent is water.

6. A printing ink composition according to claim 1, wherein the water-soluble solvent is an aliphatic alcohol containing 1 to 4 carbon atoms.

7. A printing ink composition according to claim 1 which contains, based on 100 parts by weight of said composition, 1 to 5 parts by weight of pigment, 2 to 20 parts by weight of azole, 15 to 40 parts by weight of resin, 5 to 25 parts by weight of organic solvent, and 5 to 75 parts by weight of water.

8. A printing ink composition according to claim 5 which contains, based on 100 parts by weight of said composition, 10 to 25 parts by weight of organic solvent.

9. A method of embossing a heat-foamable, resinous material, which method comprises applying a printing ink composition according to claim 1 to selected areas of the surface of said heat-foamable material containing a blowing agent, and heating said material to a temperature above the decomposition temperature of the blowing agent.

10. The structured material obtained according to claim 9.

* * * * *